United States Patent [19]

Patel et al.

[11] 4,124,736

[45] Nov. 7, 1978

[54] SURFACE PROTECTED MAGNETIC RECORDING MEMBERS

[75] Inventors: Pravin K. Patel, Los Angeles; David H. Johnston, Redondo Beach; John Makaeff, Los Angeles, all of Calif.

[73] Assignee: Poly-Disc Systems, Inc., Torrance, Calif.

[21] Appl. No.: 518,461

[22] Filed: Oct. 29, 1974

[51] Int. Cl.$^2$ .............................................. H01F 10/00
[52] U.S. Cl. ................................. 428/622; 427/130; 427/131; 427/132; 428/216; 428/472; 428/632; 428/656; 428/900; 428/928
[58] Field of Search ............... 428/622, 216, 472, 632, 428/656, 928, 900; 117/235–240; 427/127–132

[56] References Cited

U.S. PATENT DOCUMENTS

| 3,460,968 | 8/1969 | Bate et al. ........................ 117/237 |
| 3,498,837 | 3/1970 | Alstad et al. ...................... 117/239 |
| 3,516,860 | 6/1970 | Simmons ...................... 117/239 X |
| 3,719,525 | 3/1973 | Patel et al. ...................... 117/239 X |
| 3,767,369 | 10/1973 | Barlow et al. ................... 117/239 X |

*Primary Examiner*—Bernard D. Pianalto
*Attorney, Agent, or Firm*—Edward D. O'Brian

[57] ABSTRACT

It is known to manufacture a recording member having a substrate supporting a magnetic recording alloy on a surface and to locate a protective covering on the surface of the alloy remote from the substrate. An improved protective covering for use in this combination comprises a barrier layer located on the surface of the recording alloy and an oxide layer located on the surface of the barrier layer remote from the recording alloy. The barrier layer preferably consists of a nonmagnetic material. The oxide layer is also nonmagnetic and is sufficiently thick to protect the magnetic alloy layer against surface abrasion. The barrier layer isolates the oxide layer from the magnetic recording layer so as to preserve the character and uniformity of the magnetic recording layer as the oxide layer is created.

8 Claims, 1 Drawing Figure

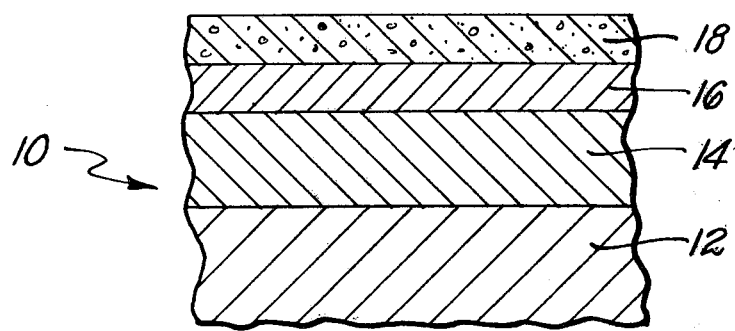

SURFACE PROTECTED MAGNETIC RECORDING MEMBERS

BACKGROUND OF THE INVENTION

The invention set forth in this specification pertains to new and improved magnetic recording members such as are commonly utilized in conjunction with computers of various known types as memory discs or the like.

Such recording members are conventionally constructed utilizing a disc shaped substrate of a metal such as aluminum or brass appearing somewhat like a common phonograph record. The surface of such a substrate is commonly coated with a magnetic recording alloy layer and such a layer in turn is normally covered with a protective covering of one sort or another. In general effective magnetic recording alloys as are used in such magnetic recording layers will normally contain from about 50 to about 97% by weight cobalt and from about 3 to about 50% by weight nickel and, if other secondary ingredients are present in such alloys, from about 3 to 50% by weight such secondary ingredients. A particularly suitable magnetic recording alloy contains about 70% by weight cobalt, about 5% by weight phosphorous and about 25% by weight nickel.

Such magnetic recording alloy layers can be from about 3 to about 100 microinches thick, although generally they are from about 14 to about 20 microinches thick. The precise composition of such a layer and the precise thickness of such a layer will depend upon an intended use of a magnetic recording member. As such members are used they are employed in connection with a transducer in such a manner that there is relative rotation between the transducer and the recording member.

In order to avoid damage to the recording alloy layer in a magnetic recording member a number of different expedients have been proposed and adopted to varying extents. It is not considered that an understanding of the present invention requires a detail discussion of all of such expedients. However, a brief review of certain of these prior ways of protecting the surface of a magnetic recording alloy layer is considered helpful in understanding the need for the present invention.

Thin films of wax, wax-like or other organic compositions have been utilized as protective coverings over such an alloy layer. Such films have only limited physical resistance against abrasion and the like. They will tend to accumulate upon the head of a transducer utilized with a magnetic recording member. Because of this it is not considered desirable to protect a magnetic recording alloy layer in this manner. It is frequently considered that effective protection of a magnetic alloy layer can be achieved by forming on the surface of an alloy layer an oxide coating from the material in the alloy layer itself.

This type of expedient has been considered to be especially desirable because of the physical properties of cobalt oxide. Inasmuch as magnetic recording alloys as indicated in the preceding predominantly contain cobalt, an oxide coating produced from such alloys will predominantly contain cobalt oxides. It is usually considered that most satisfactory coatings consist primarily of cobalt oxidized to the form of the combined oxide $Co_3O_4$. This oxide is non-magnetic and, hence, will not interfere with the intended use of a magnetic recording alloy. Further, it is physically comparatively strong when formed by a conventional process such as oxidation of cobalt in air or oxygen. Also it has a coefficient of friction which makes it desirable for use where there is relative movement between a transducer and a magnetic recording member.

The invention set forth in this specification grows out of a recognition that cobalt oxide protective coverings formed upon a magnetic recording member by methods such as air oxidation or oxidation in oxygen of the surface of a magnetic recording alloy are somewhat disadvantageous. In general even when chemical expedients such as the use of carefully controlled solutions are employed to prepare such magnetic recording alloy layers for oxidation the protective coverings tend to be of a nonuniform character. When this occurs there is, of course, a corresponding nonuniformity in the magnetic recording alloy layer supporting such a protective oxide layer.

In considering the importance of this it must be realized that the recording members to which this invention relates are used primarily in computer work. Even small variations in a magnetic recording alloy layer are quite critical from an operative standpoint in connection with such uses. Further, it must be realized that the alloy layers are employed in such recording members are comparatively thin. This has the effect of tending to accentuate even comparatively small imperfections or variations in such layers.

SUMMARY OF THE INVENTION

An objective of the present invention is to provide new and improved surface protected recording members. More specifically, the invention is intended to provide magnetic recording members of a type indicated in the preceding discussion in which the magnetic recording alloy layers are adequately protected against surface abrasion and the like and in which such alloy layers are unaffected as far as their electrical and physical properties are concerned. Thus, the invention is intended to provide magnetic recording members in which the recording alloy layers are of a uniform character and are not affected in any way by the protective covering used and/or the manufacture of such covering.

These objectives of the invention are achieved by providing a magnetic recording member having a substrate, a magnetic recording alloy supported on the surface of the substrate, and a protective covering on the surface of the magnetic recording alloy in which the improvement comprises: this covering including a barrier layer located on the surface of the alloy and an oxide layer located on the surface of the barrier layer, this oxide layer consisting essentially of a nonmagnetic oxide composition of one or more metals selected from the group consisting of metals within groups IVa, Va, VIa, VIIa, and VIII, and Ib of the Periodic Table this barrier layer consisting of one or more nonmagnetic metals from within this group is inert relative to said oxide layer and said magnetic recording alloy under the conditions of use of said magnetic recording member and during the manufacture of said oxide layer.

BRIEF DESCRIPTION OF THE DRAWING

The invention is best more fully explained with reference to the accompanying drawing in which:

The FIGURE is a diagrammatic partial cross-sectional view indicating the nature of a presently preferred embodiment of a surface protected magnetic recording member in accordance with this invention.

The precise magnetic recording member illustrated in the drawing incorporates or includes concepts or features as are verbally defined in the appended claims. These concepts or features can be employed in various different manners through the use of routine skill. The scope of the invention is not to be considered to be indicated by the drawing, but is to be considered as being set forth in the appended claims.

DETAILED DESCRIPTION

In the drawing there is shown a magnetic recording member 10 which utilizes a base or substrate 12. Such a substrate 12 will normally be an aluminum disc or the like in accordance with conventional practice. This substrate 12 will, of course, be nonmagnetic in character. This substrate 12 supports a conventional magnetic recording alloy layer 14. This layer 14 in turn supports a nonmagnetic barrier layer 16, and this barrier layer 16 in turn supports an oxide layer 18.

The layers 14, 16 and 18 are all of a completely uniform composition and all are preferably of a uniform thickness. The abutting surfaces of these layers 14, 16 and 18 should be in direct, intimate contact with one another. These layers 14, 16 and 18 should be as free from physical imperfections or flaws as reasonably possible. The layer 14 will normally be from about 3 to about 100 microinches thick and preferably it will be from about 3 to about 20 microinches thick.

The thickness of the barrier layer 16 is best indicated with reference to the function of this layer 16. This layer 16 is intended to physically isolate the layers 14 and 18 as the layer 18 is created so as to avoid any possible detrimental action on the layer 14. Thus, the layer 16 is intended to space the layer 18 in such a manner that the uniformity of the thickness of the layer 14 will not in any way be affected as the layer 18 is created.

In order to serve this function it is considered that the layer 16 should be from about ½ microinch to about 10 microinches in thickness. If this layer 16 is any thinner than about ½ microinch there is danger that this layer will not be continuous over the layer 14. Obviously if there is any discontinuity in the layer 16 such discontinuity will tend to expose a part of the layer 14 in such a manner as to permit possible damage to the layer 14. If the layer 16 is greater than about 10 microinches thick there is danger that this layer 16 will tend to interfere with the use of the recording member 10 for its intended purpose as a result of this layer 16 tending to affect the use of a recording head (not shown) in connection with the layer 14.

It is presently considered that preferred results can be achieved if the layer 16 is from about 2 to about 7 microinches thick. When the layer 16 is within this range of thickness it is sufficiently thick so as to effectively serve as a physical barrier and there is very little danger of it containing surface discontinuities. Further, when the layer 16 is this thick it is sufficiently thin so that there is normally no danger of it affecting magnetic recording.

The thickness of the layer 18 is governed by similar considerations. This layer 18 must be sufficiently thick so as to be physically strong enough to protect the layers 14 and 16 against physical damage. If it is undesirably thin it will not provide this protection. On the other hand if it is undesirably thick it will tend to interfere with the use of the recording layer 14. Because of the preferred manner of forming the layer 18 it is difficult to accurately state what is an acceptable thickness for it except by referring to the manner in which this layer 18 is made.

As hereinafter indicated it is normally formed by the oxidation in air or in oxygen of a metal or metal alloy under such conditions that substantially all of the metal or metal alloy present in this layer 18 is converted to an appropriate nonmagnetic oxide. Normally deposits of metals will grow or increase in dimension as they are oxidized and to a degree the amount of such volume of expansion will be related to the method of oxidation employed. Thus, for example, oxide layers formed from layers of different metals will vary in thickness depending upon the natures of such metals and the method of oxidizing them.

In accordance with this invention it is considered that satisfactory results can normally be achieved if the layer 18 is created from a metal or metal alloy layer applied to the layer 16 which is from about 1 to about 10 microinches thick. If such a metal layer is thinner than about 1 microinch there is danger of the oxide or oxides created from it being too thin to provide a desired degree of surface hardness and, hence, protection against abrasion and the like. If on the other hand this layer 18 is created from a metal or metal alloy layer thicker than about 10 microinches the oxide layer 18 will be so thick as to tend to interfere with the operation of the magnetic recording member 10. It is presently considered preferable to utilize a metal or metal alloy layer of from about 2 to about 5 microinches thick since such a layer when oxidized to form a layer 18 will provide an adequate degree of physical protection and will not interfere with the use of the magnetic recording alloy layer 14.

Within the broad scope of the invention a large number of different metals and alloys may be utilized in creating the oxide layer 18. It is considered that results which are at least to a degree acceptable can be achieved by oxidizing one or more metals selected from the metals within Groups IVa, Va, VIa, VIIa, VIII, and Ib of the Periodic Table of the Elements. The particular Periodic Table to which reference is made here is as reproduced on page 122 of the text Inorganic Chemistry by Moeller, Copyright 1952, John Wiley & Sons, Inc., New York, New York. The table reproduced on this page is designated as the "Conventional Long Form of the Periodic System". This is noted herein in order to avoid any possible confusion growing out of the fact that the elements have been periodically classified in various different ways.

Any metal or metals used in manufacturing the oxide layer 18 must form nonmagnetic oxides so as to avoid the possibility of the layer 18 interfering with the operation of the complete recording member 10. Further, the metal or metals should be nonmagnetic in character as it is applied to the barrier layer 16 for use in forming the layer 18 in order to avoid such interference if for one reason or another the metal applied is not completely oxidized.

It is preferred to utilize the metal cobalt or an alloy such as a cobalt-phosphorous-nickel alloy, a cobalt-gold-phosphorous alloy or the like containing at least 85% by weight cobalt as the base metal to be used in forming a layer such as the layer 18. This is because a cobalt layer can be readily oxidized to form an oxide mixture believed to contain predominantly $Co_3O_4$ which combines hardness satisfactory to provide resistance to abrasion in the complete member 10 in combination with frictional characteristics enabling the layer 18 to satisfactorily be used with transducers.

From this it would be apparent that cobalt or predominantly cobalt alloys are desirable with the invention because the oxides of cobalt have two different physical properties to a degree making such oxides desirable for the intended use. It is considered that this combination of cobalt oxides is essentially a trade-off-balance situation inasmuch as certain metals within the groups as indicated will oxidize to form oxides which are more resistant to abrasion than the oxides formed from cobalt but will have less desirable frictional characteristics than cobalt oxides.

Similarly, certain metals within the groups as indicated may have more desirable frictional characteristics than cobalt oxides but will not possess the desired physical hardness. It is considered, however, that reasonably acceptable results can be achieved utilizing the metals tungsten, titanium, and tantalum. It is also considered that acceptable results can be achieved utilizing predominantly nickel alloys.

A layer of one or more metals as indicated to be utilized to form the layer 18 may be deposited in any desired conventional manner. The conversion of such a metal to an oxide so as to form the layer 18 may be conveniently carried out by heating a metal layer created in air, oxygen, or another oxygen containing atmosphere. Such heating should be carried out at a sufficient temperature and for a sufficient time to convert all of the metal or metals present to the corresponding oxide or oxides so as to avoid the possibility of unoxidized metal remaining since any such unoxidized metal might interfere during the use of the member 10 in its intended manner.

As an example of this cobalt or cobalt alloys as noted in the preceding can be satisfactorily oxidized in atmospheric oxygen or in either pure oxygen at a temperature of from about 200° F. to a temperature of about 800° F. At lower temperatures than within this range the oxidation takes place too slowly for practical purposes. At higher temperatures than within this range there is the danger of the various materials other than in the metal or metals being used to create the layer 18 either melting or diffusing together and/or perhaps oxidizing.

The reaction involved here is essentially a normal time-temperature reaction. It is preferred to heat a cobalt alloy as indicated in an atmosphere as described at a temperature of from about 400° F. for a period of about 3 hours to a temperature of about 530° F. for a period of about 2 hours in order to obtain substantially complete conversion of the cobalt present to the oxide.

It will be recognized that other manners of oxidation than are specifically indicated herein can be utilized to oxidize metals as noted such as cobalt and cobalt alloys. Thus, for example, metals as noted can be annodized. It is not preferred to utilize such other methods of oxidation because of the possibility that the barrier layer 16 would be oxidized along with the metal used to create the layer 18. It will also be recognized that certain of the metals such as gold, silver and platinum within the broad groupings of metals indicated in the preceding will normally not be utilized in creating the layer 18 because of economic reasons and/or because of their reactivity.

From this it will be apparent that the metal used in creating the layer 16 should be chosen with reference to the metal utilized in creating the layer 18 so as to avoid oxidation of the layer 16 and so as to retain this layer 16 serving as a physical barrier between the layer 18 and the alloy layer 14. The layer 16 should be created from a metal or a metal alloy which is substantially inert under the conditions which are employed in forming the oxide layer 18. A number of different metals can be satisfactorily employed in this barrier layer 16. It is preferred to form this barrier layer 16 out of nickel-phosphorous alloy or copper because these metals are comparatively cheap, because as metals they are sufficiently hard to tend to support or reinforce the layer 18 so as to render it relatively immune to surface abrasion. Such metals are also more resistant to oxidation than cobalt or cobalt alloys as are indicated in the preceding and, hence, can be utilized with the preferred cobalt and cobalt alloys.

Satisfactory results can also be achieved in forming the layer 16 out of metals such as gold, silver, platinum, chromium and the like. In general the higher a metal is located in the Periodic Table the more suitable it is for use in forming the layer 18 while the lower a metal is on the Periodic Table the more suitable it is in forming the layer 16. This is because a differential of the ease in forming oxides. This can be stated in another way by indicating the greater the "noble" characteristics of the metal the more preferable it is from a reactivity standpoint for use in the layer 16.

Such a layer 16 can also be created upon the magnetic recording alloy layer 14 in any conventional manner which will not interfere with the alloy layer 14 and which will create a continuous, uniform deposit. It is believed that it will be apparent from a consideration of this and from a consideration that the layer of metal used in creating the layer 18 can be similarly created, that the invention set forth herein is primarily concerned with a physical structure of the recording member 10 and not with the details of forming such a structure. Such details are considered to be well within normal chemical skill.

We claim:

1. In a magnetic recording member having a substrate, a magnetic recording alloy layer supported on the surface of said substrate and a protective covering on the surface of said magnetic recording alloy layer the improvement which comprises:

said protective covering including a barrier layer located on the surface of said alloy layer and an oxide layer located on the surface of barrier layer, said barrier layer consisting of at least one non-magnetic metal which is substantially inert under the conditions which are employed in forming said oxide layer, and serving to physically separate said magnetic recording alloy layer from said oxide layer, said oxide layer consisting essentially of a non-magnetic oxide composition of at least one metal, said oxide layer being sufficiently hard so as to protect said magnetic recording member against abrasion, each of said layers being of a uniform composition, being continuous and being of a uniform thickness.

2. A magnetic recording member as claimed in claim 1 wherein:

said barrier layer is from about ½ to about 10 microinches thick and wherein said oxide layer is of a thickness determined by the dimension of an oxide film created by oxidizing a metal layer from about 1 to about 10 microinches thick.

3. A magnetic recording member as claimed in claim 1 wherein:
said oxide layer is composed of oxides created by oxidizing a metal composition containing at least 85% by weight cobalt.

4. A magnetic recording member as claimed in claim 1 wherein:
the metal in said barrier layer has a greater resistance to oxidation than the metal in said oxide layer present in the form of one or more oxides.

5. A magnetic recording member as claimed in claim 1 wherein:
said barrier layer is from about ½ to about 10 microinches thick and wherein said oxide layer is of a thickness determined by the dimension of an oxide film created by oxidizing a metal layer from about 1 to about 10 microinches thick,
said oxide layer is composed of oxides created by oxidizing a metal composition containing at least 85% by weight cobalt,
the metal in said barrier layer has a greater resistance to oxidation than the metal in said oxide layer present in the form of one or more oxides.

6. A magnetic recording member as claimed in claim 1 wherein:
said barrier layer is from about 4 to about 7 microinches thick and wherein said oxide layer is of a thickness determined by the dimension of an oxide film created by oxidizing a metal layer from about 2 to about 5 microinches thick.

7. A magnetic recording member as claimed in claim 1 wherein:
said oxide layer is composed of oxides created by oxidizing a metal composition containing at least 85% by weight cobalt and the metal in said barrier layer is a metal selected from the group consisting of nickel and copper.

8. A magnetic recording member as claimed in claim 1 wherein:
said barrier layer is from about 4 to about 7 microinches thick and wherein said oxide layer is of a thickness determined by the dimension of an oxide film created by oxidizing a metal layer from about 2 to about 8 microinches thick,
said oxide layer is composed of oxides created by oxidizing a metal composition containing at least 85% by weight cobalt and the metal in said barrier layer is a metal selected from the group consisting of nickel and copper.

* * * * *